United States Patent [19]

Steffier

[11] Patent Number: 5,639,861
[45] Date of Patent: Jun. 17, 1997

[54] CROSSLINKED METHACRYLIC ANHYDRIDE COPOLYMERS

[75] Inventor: Larry Wayne Steffier, Cherry Hill, N.J.

[73] Assignee: Rohm and Haas Company, Phila., Pa.

[21] Appl. No.: 467,675

[22] Filed: Jun. 6, 1995

Related U.S. Application Data

[62] Division of Ser. No. 891,381, May 29, 1992.

[51] Int. Cl.$^6$ .......................... C07K 17/08; C08F 120/08
[52] U.S. Cl. ........................................ 530/417; 526/72
[58] Field of Search ............................. 530/417; 526/72

[56] References Cited

U.S. PATENT DOCUMENTS

| | | |
|---|---|---|
| 2,308,581 | 1/1943 | Barnes . |
| 2,324,935 | 7/1943 | Kautte et al. . |
| 2,988,541 | 6/1961 | Semon et al. . |
| 3,298,925 | 1/1967 | Mosbach ............................ 530/417 |
| 3,764,477 | 10/1973 | Lehmann et al. . |
| 3,871,964 | 3/1975 | Huper et al. . |
| 4,070,348 | 1/1978 | Kraemer et al. ...................... 526/273 |
| 4,221,871 | 9/1980 | Meitzner . |
| 4,610,962 | 9/1986 | Takagi et al. ........................ 435/179 |
| 4,758,639 | 7/1988 | Koyanagi et al. . |

FOREIGN PATENT DOCUMENTS 781400  8/1957  United Kingdom .

*Primary Examiner*—Joseph L. Schofer
*Assistant Examiner*—Wu C. Cheng
*Attorney, Agent, or Firm*—John E. Taylor, III

[57] ABSTRACT

Suspension-polymerized, crosslinked copolymers of methacrylic anhydride yield beads suitable as precursors for weak-acid and other ion exchange resins, affinity chromatography materials and other materials which require spherical polymers having reactive anhydride groups for their preparation. Both gel and macroporous beads of these copolymers may be made by the process of the invention.

7 Claims, No Drawings

CROSSLINKED METHACRYLIC ANHYDRIDE COPOLYMERS

This application is a division of application Ser. No. 07/891,381, filed May 29, 1992.

This invention relates to crosslinked, insoluble copolymers, and more particularly to crosslinked copolymers of methacrylic anhydride suitable for use as adsorbents and ion-exchange resin precursors.

BACKGROUND OF THE INVENTION

Ion-exchange resins prepared by copolymerizing acrylic and methacrylic acids with crosslinking monomers are well known, and are useful as weakly acidic cation exchangers. Because the monomers of these acids are hydrophilic, and water soluble to a significant extent, the copolymers are more difficult to prepare by suspension polymerization than resins made from acrylic and methacrylic esters. The esters are relatively insoluble in water and hydrophobic, and as a result polymerize within the droplets of the oil phase, forming relatively clean beads. The acids, however, tend to polymerize partially within the aqueous suspending phase as well, forming undesirable, aqueous-phase polymer that wastes monomer and interferes with formation of clean copolymer beads.

Special techniques must be employed to minimize this tendency of the acid monomers to dissolve in the aqueous phase. One such technique is to add inorganic salts to the aqueous phase, "salting out" the monomer, or reducing its solubility in the resulting brine to the point where it is forced into the oil phase where its polymerization is desired. Not only must the salt be recovered, either for re-use or to permit ecologically responsible disposal of the waste aqueous phase, but it tends to cause the oil-phase droplets to distort during polymerization. This promotes formation of non-spherical copolymer beads, which have unpredictable hydraulic properties and pack poorly in ion-exchange columns.

Porous resin beads are particularly advantageous for certain uses, for example as adsorbents or as ion exchangers with rapid kinetic properties. Porosity is introduced into the beads in a number of different ways; the use of a phase-separating agent to form macroreticular beads, as disclosed by Meitzner et al., in U.S. Pat. No. 4,221,871 is one common way to generate this porosity. Selection of the phase-separating agent offers some control over the total porosity, the pore sizes and the pore-size distribution in the finished beads. Because methacrylic acid in the oil phase dissolves some water from the aqueous phase, the water reduces the solubility of the total monomer solution in the oil phase, and phase separation occurs in the absence of an introduced phase-separating agent. Consequently the preparation of macroreticular resins from methacrylic acid is simpler, but control over the pore parameters is limited.

Anhydrides of acids are known to hydrolyze in the presence of strong acids or bases to form the acids themselves. Anhydride polymers, such as polymers of maleic anhydride, introduce into copolymers reactive sites that may be used for subsequent reactions, such as ion-exchange functionalization, as is disclosed in U.S. Pat. No. 2,988,541 to Semon et al. or U.S. Pat. No. 3,871,964 to Hüper et al. Methacrylic anhydride has been disclosed, within a broad disclosure of esters, amides and nitriles of methacrylic acid, as a monomer for preparing copolymers that could then be functionalized as a weakly acidic cation exchanger (U.S. Pat. No. 2,324,935 to Kautter), and British Patent No. 894,391 to Bayer suggests methacrylic anhydride as one of a broad range of olefinically unsaturated carboxylic acids, esters and anhydrides from which copolymer having "a sponge structure" might be made, but no practical preparations of such copolymers are shown.

Others, as for example Kraemer et al. in U.S. Pat. No. 4,070,348, Lehmann et al. in U.S. Pat. No. 3,764,477 and Barnes in U.S. Pat. No. 2,308,581, made copolymers of methacrylic anhydride by bulk or precipitation polymerization or reverse-phase, suspension polymerization in which the continuous, suspending phase was an organic rather than an aqueous liquid. Lehmann et al. (above) mentions suspension polymerization as a possibility, but without exemplifying a practical preparation.

SUMMARY OF THE INVENTION

I have discovered beads of crosslinked, methacrylic anhydride copolymer which are useful as adsorbents, affinity-chromatography materials, ion-exchange resins and precursors of these materials, the beads being polymerized from a mixture comprising at least about 50 weight percent methacrylic anhydride and from about 0.1 to about 50 weight percent polyethylenically unsaturated crosslinking monomer. I have further discovered the process by which these copolymer beads may be prepared with controlled surface area and particle size, and where porous beads are made, the porosity may also be controlled. This process comprises a. suspending droplets of a monomer mixture comprising methacrylic anhydride in an amount that is at least 50% by weight of the monomer, a crosslinking monomer and a monomer-soluble, free-radical polymerization initiator in an aqueous suspending medium, b. heating the droplets above the decomposition temperature of the polymerization initiator until the monomer mixture has polymerized to form copolymer beads, and c. separating the copolymer beads from the suspending medium.

DETAILED DESCRIPTION OF THE INVENTION

Although other monomers are copolymerized with the methacrylic acid to make the copolymer beads of the present invention, the copolymer is predominantly poly(methacrylic anhydride). As used herein, the term, "predominantly" means that the polymer contains at least 50 weight percent of polymerized units of the indicated polymer, in this case, poly(methacrylic anhydride).

The monomers which are copolymerized with methacrylic anhydride to form the copolymer beads of the present invention comprise at least one polyethylenically unsaturated crosslinking monomer which is present at levels from about 0.1 to about 50 weight percent of the total monomers. The crosslinking monomer or monomers may be aliphatic, as for example acrylic crosslinkers such as ethylene glycol dimethacrylate, ethylene glycol diacrylate, trimethyiolpropane di- and triacrylates, trimethylolpropane di- and trimethacrylates, divinylketone, allyl acrylate, diallyl maleate, diallyl fumarate, diallyl succinate, diallyl carbonate, diallyl malonate, diallyl oxalate, diallyl adipate, diallyl sebacate, divinylsebacate, N,N'-methylenediacrylamide, N,N'-methylene dimethacrylamide and polyvinyl or polyallyl ethers of glycol, of glycerol, of pentaerythritol of mono- or dithio-derivatives of glycols or resorcinol and the like, or they may be aromatic, as for example styrenic crosslinkers such as divinylbenzene, trivinylbenzene, divinyltoluenes, divinylnaphthalenes, diallyl phthalate, divinylxylene, divinylethylbenzene and the like, or they may be heterocyclic crosslinkers such as divinylpyridine Such crosslinking monomers are well known to those skilled in the art.

Other monomers which may be copolymerized with the methacrylic anhydride include other acrylic monomers, such as acrylic and methacrylic acids and their esters, including their esters of $C_1$–$C_{18}$ alkyl, cycloalkyl, aryl, aralkyl and alkaryl alcohols. Other aliphatic monomers which may be copolymerized with the methacrylic anhydride include acrylonitrile and methacrylonitrile, vinyl chloride, vinyl formate, vinyl alkyl ethers such as methylvinyl ether, acrylamide, methacrylamide, and aromatic monomers such as ethylvinylbenzene, styrene, α-methylstyrene, vinyltoluene, vinylnaphthalene and the like. Other monomers may be present alone or as mixtures of one or more other monomers. Methacrylic anhydride is present at levels of at least 50 weight percent in all monomer mixtures useful for preparing the copolymer beads of the present invention.

The macroporous copolymer beads of the present invention may be prepared by suspension polymerization of a mixture of the monomers which contains at least 50 weight percent methacrylic anhydride. In suspension polymerization the monomer mixture is suspended as droplets in an aqueous suspending medium which optionally contains stabilizing agents and other additives to promote stable, uniformly sized droplets. The reaction is initiated by the generation of free radicals in the monomer mixture, which may result from thermal decomposition of free-radical-generating initiators such as peroxides, peracid salts, azo initiators and the like in the presence of the monomer, but may also result from redox initiators such as t-butyl hydroperoxide with sodium formaldehyde hydrosulfite, or from ultraviolet or other ionizing radiation. Preferred for initiating the polymerization is inclusion of a monomer-soluble, thermally unstable initiator in the monomer mixture, and heating, to a temperature above the thermal decomposition point of the initiator, the suspending medium in which the monomer droplets are suspended.

Examples of such monomer-soluble, thermally unstable initiators include peroxides and hydroperoxides and related initiators such as benzoyl peroxide, t-butyl hydroperoxide, cumene peroxide, tetralin peroxide, acetyl peroxide, caproyl peroxide, t-butyl perbenzoate, t-butyl diperphthalate, methyl ethyl ketone peroxide and the like. Also useful are azo initiators such as azodiisobutyronitrile, azodiisobutyramide, azobis(α,α-dimethylvaleronitrile), azobis(α-methylbutyronitrile) and dimethyl, diethyl or dibutyl azobis (methylvalerate). The peroxide initiators are preferably used at a level of from about 0.01% to 3% by weight, based on the total weight of the monomers, and the azo initiators are preferably used at a level from about 0.01% to about 2% by weight, based on the total weight of the monomers.

The preferred initiators are those having a relatively low decomposition point, that is, below about 60° C., such as α-cumyl peroxyneodecanoate and di(4-t-butylcyclohexyl) peroxydicarbonate, as these permit polymerization at relatively low temperatures at which the anhydride functionality is less likely to hydrolyze or react with other components present in the reaction.

The preferred copolymer beads of the present invention are macroporous, that is, they contain pores having a diameter between about 5 and about 10,000 nm, the pores contributing an internal pore volume to the bead which is at least about 5% of the volume of the bead itself (5% pore volume). As a consequence of the porosity the surface area of the macroporous beads is significantly greater than for gel polymer beads (those which do not contain macroporosity). One method of introducing this macroporosity is disclosed in U.S. Pat. No. 4,221,871, to Meitzner et al., which is mentioned above and which involves introducing to the monomer mixture a porogen, also known as a precipitant, phase extender and phase-separating agent. The porogen is a good solvent for the monomer but a poor solvent for the polymer, and preferred porogens do not react with the monomer or polymer. Particularly preferred porogens useful in preparing the copolymer beads of the present invention include iso-octane, methyl isobutyl ketone, methyl isobutyl carbinol, xylene, toluene, di-n-butyl ether and the like. Especially preferred are the more hydrophobic porogens, such as iso-octane and xylene, as they are less likely to promote hydrolysis of the anhydride groups during polymerization. The pore size and surface area of the macroporous polymer beads may be controlled by techniques readily apparent to those skilled in the art, those techniques including the varying of porogen type and concentration, crosslinker type and concentration, initiator type and concentration, polymerization temperature and the like. Other methods of introducing macroporosity into the copolymer beads which are known to those skilled in the art may also be used.

Alternatively, other known methods of making copolymer beads may be employed using the methacrylic anhydride monomer or mixture of monomers described above to prepare the copolymer beads of the present invention, as either gel or macroporous beads. The monomer may be introduced to an aqueous suspension of pre-formed polymer beads, known as seed beads, which are swellable in the monomer, and the monomer which is taken into the beads to swell them is then polymerized. In this process the polymer beads may be crosslinked, in which case methacrylic anhydride may be the sole monomer, or the monomer mixture may omit any additional crosslinking monomer. The polymer beads may also be uncrosslinked, in which case the monomer mixture preferably contains the crosslinking monomer. The monomer mixture preferably contains the polymerization initiator. Because the growth of the seed particles in this process may be controlled, this seed process allows effective control of the final particle size. Additionally, if the seed beads are of uniform diameter, as results from particle-size classification or from processes which inherently produce uniformly sized particles, as for instance emulsion polymerization, the resulting copolymer beads containing the anhydride will also be uniform in size, and larger than the seed beads.

Another alternative process, which also tends to produce beads having uniform diameter, is introducing the monomer mixture into the suspending medium by jetting it at a controlled rate through one or more orifices of uniform diameter into a moving stream of the suspending medium. The monomer droplets thus formed have a uniform diameter, and when they are polymerized by being heated in the suspending medium to a temperature above the decomposition point of the initiator, the resulting copolymer beads retain the particle-size uniformity. These beads may be used as formed, or they may serve as seed beads for the above-described process of growing seed beads to a larger, controlled size.

In both of these alternative processes, and others which may readily occur to those skilled in the art as useful for making the copolymer beads of the present invention, the introduction of macroporosity to the beads, as described above, remains a preferred embodiment.

The size of the beads produced by any of the processes mentioned above may be controlled over the range from about 10 μm to about 2 mm, more preferably from about 50 μm to about 1 mm. The adjustment of particle size in suspension polymerization is readily apparent to those skilled in the art, and includes such techniques as varying the interfacial tension at the oil-water interface, varying the viscosity of either or both phases, and varying the speed of agitation.

A particular advantage of the present invention, which is evident in the processes for making the copolymer beads of the present invention by suspension polymerization, is elimination of the need to include in the aqueous suspension medium any inorganic salts or other water-soluble components, as for example the aqueous phase inhibitors used to reduce aqueous polymer buildup, in order to reduce the solubility of the monomer in water. As described above, monomer solubility is a particular problem when weak-acid cation-exchange resins are made from methacrylic acid monomer. Because the methacrylic anhydride monomer is relatively insoluble in water, such salts and other water-soluble components need not be present, although their presence does not exclude a process from the present invention as it is most broadly contemplated.

Once formed, the copolymer beads of the present invention may be reacted to introduce ion-exchange or chelating functional groups, specific affinity ligands, or any of a wide assortment of hydrophilic or hydrophobic moieties, or combinations of these, to the beads. The anhydride functionality from the methacrylic anhydride monomer is present in the copolymer, is particularly reactive, and provides convenient reaction sites for the attachment of other functional groups. Hydrolysis of the anhydride to weak-acid carboxylic groups is also a route to form cation-exchange functional groups on the copolymer. It should be noted that at least a fraction of the anhydride groups are hydrolyzed to form carboxylic groups during the polymerization reaction; this fraction is typically below about 20%, and frequently below about 15%, of the total anhydride groups which theoretically would be present in the copolymer. Further hydrolysis with acid to form weak-acid carboxylic groups in the hydrogen form, or with an alkali-metal hydroxide to form weak-acid carboxylic groups in the alkali-metal form may be used to increase the weak-acid functionalization.

Other examples of the reactions that may be used to create functional groups on the beads, and the resulting functional groups, include reaction with ammonia to form ammonium salts of the carboxylic acid group, and reaction with amines, including primary, secondary and tertiary amines and polyethyleneamines, to form amine salts. Other suitable derivatives of the anhydride polymers include the alkyl or other esters and amides, preferably the $C_1$–$C_8$ alkyl esters and amides, and alkylamides, dialkylamides, arylamides, alkarylamides and alkylamides having amine substitution, prepared by reacting carboxyl groups on the polymer with the appropriate amines or alkyl or phenylalkyl alcohol, as well as amino esters, amino amides, hydroxy amides and hydroxy esters, where the functional groups are separated by alkylene, phenyl, alkyleneamine, alkylene oxide, phenylalkyl, phenylalkylphenyl or alkylphenylalkyl or other aryl groups. Substituents bearing amines or amine salts including quaternary amine salt groups are conveniently formed by reacting the carboxyl groups on the polymer with polyfunctional amines such as dimethylaminoethanol, to form an amide linkage with the polymer, or in certain cases when higher temperatures are employed, to form an imide linkage with a vicinal carboxyl, or reacting the anhydride groups on the polymer with the same polyfunctional amines to form ester linkages with the polymer. Sulfur-containing derivatives may similarly be made by reacting the anhydride group with thiols and thioalcohols. The manner in which such functionalizations of the copolymer beads may be carried out will readily be apparent to those skilled in the art, as will additional functionalities which may be incorporated into the copolymer beads.

Hybrid resins may be produced by filling the pores of the macroporous copolymer beads or functionalized resin beads of the present invention with monomer, which may be the same as or different from the monomer used to produce the macroporous beads, polymerizing the monomer, and then functionalizing the newly formed polymer in the pores with a different functionality from that on the beads to produce beads with a dual functionality. Alternatively, the surface of macroporous copolymer beads or functionalized resin beads from the prior art may be coated with, or the pores filled with, the methacrylic anhydride monomers of the present invention, which may then be polymerized to form either a hybrid resin having dual functionality, or a macroreticular bead having a coating of the methacrylic anhydride polymer of the present invention. Advantages offered by this latter structure include control of swelling and diffusion kinetics by choice of the base macroporous polymer, improved chemical stability of the coated beads, and a reduced potential for bead fouling.

The following examples are intended to illustrate the invention and not to limit it except as it is limited in the claims. All percentages and ratios are by weight unless otherwise specified, and all reagents used are of good commercial quality unless otherwise specified.

EXAMPLE 1

The following example illustrates preparation of macroporous resin beads of the present invention from methacrylic anhydride.

To a 1-liter, 4-neck, round-bottom flask equipped with a stirrer, liquid-cooled condenser and thermocouple probe was charged 462.45 g deionized water, 27.5 g of 2% aqueous hydroxyethylcellulose solution, 9.0 g of 10% aqueous, 98%-hydrolyzed polyvinyl alcohol having a molecular weight of 11,000–31,000, and 0.15 g sodium nitrite. The charge was stirred for one hour at 300 rpm. An organic mixture was prepared separately by mixing 12.5 g o-xylene, 4.7 g of 80% divinylbenzene (the remainder being primarily ethylvinylbenzene), 32.8 g methacrylic anhydride (99.5% purity), 0.5 g of a 75% mineral-spirits solution of α-cumyl peroxyneodecanoate and 0.375 g di(4-t-butylcyclohexyl) peroxydicarbonate, and agitating the mixture until the initiators were fully dissolved in the liquid. At the end of the 1-hour stirring period, stirring of the flask charge was continued while the organic mixture was slowly added to the flask. When addition of the organic mixture was complete, the flask contents were heated, with stirring, at 1 C.°/minute to 35° C., and then at 0.2 C.°/minute to 75° C. The flask contents were held at 75° C, with stirring, for one hour, and then allowed to cool to room temperature. The resulting beads were drained, washed three times with an amount of acetone equal to the bead volume, then allowed to dry in a Buchner funnel with vacuum. After drying, a 25-g sample of the copolymer beads was treated with 120 g of a 50% (wt/wt) aqueous solution of sodium hydroxide and 300 ml deionized water at a temperature of 80°–90° C. for approximately three hours, and allowed to cool overnight with agitation, to convert the anhydride groups in the copolymer to weak-acid groups in the sodium form. Following this reaction the beads were washed with deionized water, drained and dried. The properties of these beads and those of Examples 2 through 6, below, are shown in Table 1, below.

EXAMPLE 2

This example illustrates a preparation of macroporous resin beads of the present invention similar to that of Example 1, using the same organic mixture with different suspending agents and a steeper temperature profile to a lower final polymerization temperature.

The procedure of Example 1 was repeated except that the initial charge to the flask was 449.15 g deionized water, 0.75 g carboxymethyl-methylcellulose and 0.05 g sodium lauryl sulfate, and the reaction mixture was heated at 1 C.°/minute to 60° C. and held at that temperature for five hours before allowing it to cool to room temperature.

EXAMPLE 3

This example illustrates a preparation of macroporous polymer beads of the present invention similar to that of Example 2 using an acrylic crosslinking agent, trimethylolpropane trimethacrylate in place of the divinylbenzene, and a different organic solvent, methyl isobutyl ketone in place of the o-xylene.

Using the procedure of Example 1 and the initial charge to the flask and the heating schedule of Example 2, polymer beads were prepared using, as the separately prepared organic mixture, 23.0 g methyl isobutyl ketone, 10.0 g trimethylolpropane trimethacrylate, 27.5 g methacrylic anhydride (99.5% purity), 0.5 g of a 75% mineral spirits solution of α-cumyl peroxyneodecanoate and 0.375 g di(4-t-butylcyclohexyl)peroxydicarbonate.

EXAMPLE 4

This example illustrates yet another preparation of macroporous resin beads of the present invention, using different conditions and reagents.

Using the procedure of Example 1, an aqueous mixture of 750 g deionized water, 1.26 g carboxymethylmethylcellulose and 0.09 g pure, powdered sodium lauryl sulfate was prepared in the reaction flask, and to this was added an organic mixture of 50.0 g methyl isobutyl ketone, 30.0 g trimethylolpropane trimethacrylate, 82.5 g methacrylic anhydride (92% purity), 1.0 g of a 75% mineral spirits solution of α-cumyl peroxyneodecanoate and 0.76 g di(4-t-butylcyclohexyl)peroxydicarbonate. The reaction mixture was heated to 50° C. at 1 C.°/minute, from 50° to 58° C. at 0.5 C.°/minute, held at 58° C. for 1.5 hours, then allowed to cool to room temperature, and resin beads of the present invention were recovered, dried, and post-treated as described in Example 1.

A portion of these beads were functionalized with a polyamine to form an anion-exchange resin according to the following procedure. An additional, 0.677-g sample of the dry copolymer beads was transferred to a 1-liter, round-bottom flask and suspended with agitation in 250 g deionized water. In a 500-ml beaker 3.0 g triethylenetetramine (TETA) was suspended in 250 ml deionized water, and the suspended amine was added, dropwise, to the flask containing the copolymer beads. After addition of the amine, the flask contents were heated to 50° C. and held at that temperature for five hours, after which they were cooled, washed with deionized water, and dried. Results of particle-size measurements are for these TETA-functionalized beads.

EXAMPLE 5

This example illustrates another preparation of macroporous resin beads of the present invention, using a different organic mixture.

Using the procedure of Example 1 and the aqueous mixture and temperature profile of Example 4, resin beads were prepared using as an organic mixture 50.0 g methyl isobutyl ketone, 15.0 g trimethylolpropane trimethacrylate, 97.5 g methacrylic anhydride (92% purity), 1.0 g of a 75% mineral spirits solution of α-cumyl peroxyneodecanoate and 0.76 g di(4-t-butylcyclohexyl) peroxydicarbonate. The copolymer beads were recovered, dried and post-treated according to the procedure of Example 1. After drying, a sample of the copolymer was converted to the TETA form as described in Example 4, and results of the particle-size measurements are for these TETA-functionalized beads.

EXAMPLE 6

This example illustrates a preparation of macroporous resin beads of the present invention using a low level of the divinylbenzene crosslinker of Examples 1 and 2 with the methyl isobutyl ketone porogen of Examples 3 through 5.

Resin beads were prepared using the procedure of Example 1, the aqueous mixture of Examples 4 and 5, and an organic mixture of 30.645 g methyl isobutyl ketone, 2.563 g divinylbenzene (80% purity), 47.95 g methacrylic anhydride (92% purity), 0.665 g of a 75% mineral spirits solution of α-cumyl peroxyneodecanoate and 0.5 g di(4-t-butylcyclohexyl)peroxydicarbonate. The reaction mixture was heated to 50° C. at 1 C.°/minute, held at 50° C. for four hours, and allowed to cool to room temperature. The copolymer beads were recovered, dried and post-treated according to the procedure of Example 1.

Cytochrome-c Capacity and Recovery Determination

Each of the resins prepared above was tested for its capacity to adsorb and elute the protein, cytochrome-c. For determining the cytochrome-c capacity, that amount of cytochrome-c which the resin can adsorb from solution per unit volume of resin, a 20-ml, wet sample of each resin was pre-treated by transferring it to a glass chromatographic column having a 2.5-cm internal diameter and a length of at least 20 cm. Free liquid was forced from the column by applying air pressure of 2 bars to the top of the column. The column was then filled with HPLC grade methanol which was similarly forced through the column at a pressure of 2 bars; this was repeated until 200 ml of methanol had been forced through the column. The methanol was then forced from the column and 200 ml of purified, deionized water were similarly forced through the column. The water was forced from the column and 200 ml of 0.05M acetate buffer solution (3.0 g glacial acetic acid in 1000 ml water, adjusted to pH 5.4 with 50% aqueous sodium hydroxide solution) were similarly forced through the column.

The exact volumes of approximately 2-ml samples of the resins pre-treated as described above were determined, and the samples were diluted with the acetate buffer to a total volume of 80 ml resin plus buffer. Each sample was transferred to a 250-ml container and 20 ml of a 20 mg/ml solution of cytochrome-c (Sigma C-2506; Sigma Chemical Co., St. Louis, Mo.) in acetate buffer was rapidly added. The container was closed and shaken for 30 minutes, after which the resin was allowed to settle for 5 minutes. The ultraviolet absorbance of the supernatant liquid was determined at 550 nanometers (nm) and compared to that of standard cytochrome-c solutions to determine its free cytochrome-c concentration. The cytochrome-c capacity of the resin was calculated using Formula 1:

$$\text{Capacity} = (400 - (100 \times C_s))/V_r \quad \text{Formula 1}$$

where $C_s$ is the cytochrome-c concentration (mg/ml) in the supernatant liquid and $V_r$ is the volume of the resin sample (ml).

Cytochrome-c recovery, the amount of cytochrome-c adsorbed onto the resin which could be eluted from it, was determined by transferring all of each 2-ml sample from the capacity determination above to a glass chromatographic column having a 1-cm internal diameter and rinsing it with 4–5 ml of the acetate buffer to remove as much of the remaining cytochrome-c solution as possible. Exactly 100.0 ml of 0.5M sodium chloride solution in acetate buffer was then passed through each resin sample at a rate of 1 ml/minute, and the ultraviolet absorbance of the collected sodium chloride solution was determined at 550 nm. The free cytochrome-c concentration in the sodium chloride solution was determined as above by comparing it to the standard solutions, and the recovery for the resin was calculated from Formula 2:

$$\text{Recovery } (\%) = (100 \times C_r)/(V_r \times \text{Capacity}) \quad \text{Formula 2}$$

where $C_r$ is the concentration (mg/ml) of cytochrome-c in the sodium chloride solution, Capacity is the cytochrome-c capacity of the resin as calculated by Formula 1, and Vr is the volume of the resin sample, as described above. The results of both of these determinations for the resins of Examples 1 through 6 are shown below in Table 1.

Also shown in Table 1, below, are the results of streptomycin-capacity determinations on the copolymers of Examples 4, 5 and 6; results are given in streptomycin activity units per milliliter of wet resin. Each milligram of streptomycin sulfate is approximately equal to 767 streptomycin activity units.

In Table 1, below, comparative results are also shown for two different ground and classified, weak-acid, macroporous, methacrylic acid-divinylbenzene resins of the prior art, one (Comparative Example A) having a particle size distribution in the range of 150 to 300 μm and the other (Comparative Example B) having a particle size distribution in the range of 75 to 105 μm.

TABLE 1

| Example | Particle Size (μm) | CEC[3] (meg/g) | Cyto-C[4] Capacity (mg/ml) | Cyto-C[4] Recovery (%) | Strep Recovery (Strep Units)[5] |
|---|---|---|---|---|---|
| 1 | — | — | 72 | 91 | — |
| 2 | 277[1] | 6.86 | 144 | 82 | — |
| 3 | 202[1] | 5.48 | 157 | 98 | — |
| 4 | 160[2] | 6.95–7.72 | 19 | 85 | 305 |
| 5 | 160[2] | 8.73–9.17 | 44 | 81 | 251 |
| 6 | 500 | 6.9 | — | — | 101 |
| A | 150–300 | 11.7 | 82 | 100 | — |
| B | 75–150 | 10.3 | 11 | 87 | — |

[1]Particle size was measured in the sodium form.
[2]Particle size was measured in the TETA form.
[3]Cation Exchange Capacity
[4]Cytochrome-c
[5]Streptomycin capacity in Streptomycin Activity Units.

As may be seen from the above Examples 1–6 and the results shown in Table 1, the cation-exchange capacity of the resins of the present invention is satisfactory for many purposes, the capacity and recovery for proteins such as cytochrome-c and streptomycin ranges from good to excellent, and the resins themselves may be prepared without the need for elaborate procedures involving salting-out and the like to eliminate monomer solubility problems.

EXAMPLE 7

This example illustrates preparation of a gel resin of the present invention using the suspension aids of Example 2, and omitting the porogen.

An aqueous phase was prepared by mixing 958.47 g deionized water, 1.44 g carboxymethyl-methyl cellulose, and 0.0864 g sodium lauryl sulfate in a 2-liter, round-bottom flask until the solid materials dissolved. A separate organic phase was prepared by mixing 88.87 g commercial divinylbenzene (55% purity), 163.97 g methacrylic anhydride (94% purity), 4.8 g di(4-t-butylcyclohexyl)peroxydicarbonate initiator and 3.2 g α-cumyl peroxyneodecanoate initiator until the initiators dissolved. The organic phase was added to the aqueous phase with stirring, to form a suspension of organic droplets in the aqueous phase. The mixture was heated from 25° to 60° C. at 0.5 C.°/min and held at 60° C. for four hours; because of an exotherm, the temperature rose to 65° C. for 20 minutes. At the end of the reaction period the flask contents were cooled, the solid material was separated from the liquid in a Buchner funnel, and the solid material was washed with acetone. This solid material was in the form of non-porous, or gel, copolymer beads.

I claim:

1. A process for adsorbing proteins onto a copolymer functionalized with functional groups having an affinity for proteins which comprises contacting the proteins with the functionalized copolymer in the form of crosslinked, macroporous, spherical copolymer beads having a particle size between about 10 μm and about 2 mm, the copolymer being predominantly poly(methacrylic anhydride).

2. The process of claim 1 wherein the proteins are in an aqueous suspension.

3. The process of claim 1 wherein the copolymer is functionalized with carboxylic acid functional groups.

4. The process of claim 2 wherein the proteins adsorbed onto the copolymer are subsequently removed from the copolymer into a liquid which is different from the aqueous suspension.

5. The process of claim 4 wherein at least about 80 weight percent of the proteins adsorbed onto the copolymer are subsequently removed from the copolymer into a liquid which is different from the aqueous suspension.

6. The process of claim 4 wherein at least about 95 weight percent of the proteins adsorbed onto copolymer are subsequently removed from the copolymer into a liquid which is different from the aqueous suspension.

7. The process of claim 4 wherein at least about 95 weight percent of the proteins adsorbed onto the copolymer are subsequently removed from the copolymer into a liquid which is different from the aqueous suspension.

* * * * *